(12) United States Patent
Matsumoto et al.

(10) Patent No.: US 8,493,961 B2
(45) Date of Patent: Jul. 23, 2013

(54) TRANSMISSION TIMING CONTROL METHOD, BASE STATION APPARATUS AND MOBILE STATION APPARATUS

(75) Inventors: Atsushi Matsumoto, Ishikawa (JP); Sadaki Futagi, Ishikawa (JP); Kenichi Miyoshi, Kanagawa (JP); Daichi Imamura, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 11/813,582

(22) PCT Filed: Jan. 11, 2006

(86) PCT No.: PCT/JP2006/300169
§ 371 (c)(1),
(2), (4) Date: Jul. 9, 2007

(87) PCT Pub. No.: WO2006/075586
PCT Pub. Date: Jul. 20, 2006

(65) Prior Publication Data
US 2009/0046604 A1 Feb. 19, 2009

(30) Foreign Application Priority Data
Jan. 12, 2005 (JP) .................................. 2005-005287

(51) Int. Cl.
*H04J 3/06* (2006.01)
(52) U.S. Cl.
USPC ............................. 370/350; 370/280; 375/354
(58) Field of Classification Search
USPC .................. 370/280, 208–210, 328, 338, 350, 370/331, 343; 375/260; 455/450, 452.1
See application file for complete search history.

(56) References Cited

U.S. PATENT DOCUMENTS 5,793,772 A * 8/1998 Burke et al. .................. 370/508
6,031,831 A * 2/2000 Tan Boon et al. ............. 370/342
(Continued)

FOREIGN PATENT DOCUMENTS

CN 1161766 A 10/1997
EP 1 124 347 8/2001
(Continued)

OTHER PUBLICATIONS

PCT International Search Report dated Feb. 14, 2006.
(Continued)

*Primary Examiner* — Mark Rinehart
*Assistant Examiner* — Christopher R Crompton
(74) *Attorney, Agent, or Firm* — Dickinson Wright PLLC

(57) ABSTRACT

A wireless communication method for improving the transmission efficiency in an upstream communication in OFDMA-TDD system or the like. An upstream transmission timing control part (108), which employs this method, controls, based on the OFDMA-TDD scheme, the transmission timings of a mobile station (#p) and a mobile station (#M) communicating with a base station (100). The upstream transmission timing control part (108) acquires information about the propagation delay times τp and τM of the mobile station (#p) and mobile station (#M). When the propagation delay time τp is shorter than the propagation delay time τM, the upstream transmission timing control part (108) decides the transmission timings of the mobile station (#p) and mobile station (#M) such that the timing at which the base station (100) starts receiving symbols from the mobile station (#p) in an upstream section is earlier, by αp times an OFDM symbol length (L) (where αp is a natural number), than the timing at which the base station (100) starts receiving symbols from the mobile station (#M) in the same section.

16 Claims, 6 Drawing Sheets

U.S. PATENT DOCUMENTS

| | | | |
|---|---|---|---|
| 6,381,236 B1 | 4/2002 | Miyashita et al. | |
| 6,804,191 B2 * | 10/2004 | Richardson | 370/208 |
| 2002/0150065 A1 * | 10/2002 | Ponnekanti | 370/334 |
| 2002/0159413 A1 | 10/2002 | Tsubouchi et al. | |
| 2008/0285670 A1 * | 11/2008 | Walton et al. | 375/260 |

FOREIGN PATENT DOCUMENTS

| | | |
|---|---|---|
| EP | 1 233 547 | 8/2002 |
| JP | 11113049 | 4/1999 |
| JP | 11163779 | 6/1999 |
| JP | 11177951 | 7/1999 |
| JP | 11215107 | 8/1999 |
| JP | 11331133 | 11/1999 |
| JP | 2002252865 | 9/2002 |
| JP | 2003092608 | 3/2003 |
| WO | 96/08885 | 3/1996 |
| WO | 02/073870 | 9/2002 |

OTHER PUBLICATIONS

Y. Matsui, et al.; "OFDM/TDD Joge Hi Taisho Packet Tsushin System ni Okeru Agari Kaisen Tekio Sub Carrier Seigyo Hoshiki ni Kansuru Kento," IEICE Technical Report, The Institute of Electronics, Information and Communication Engineers, Nov. 10, 2000, RCS2000-172.

Y. Matsui, et al.; "OFDM/TDD Joge Hi Taisho Packet Tsushin System ni Okeru Cell Kurikaseshi Kazu no Eiko ni Kansuru Kento," Proceedings of the 2001, The Institute of Electronics, Information and Communication Engineers General Conference, The Institute of Electronics, Information and Communication Engineers, Mar. 7, 2001.

Chinese Office Action, dated Jan. 8, 2010.

European Search Report dated Oct. 20, 2010.

* cited by examiner

TRANSMISSION TIMING CONTROL METHOD, BASE STATION APPARATUS AND MOBILE STATION APPARATUS

TECHNICAL FIELD

The present invention relates to a transmission timing control apparatus, base station apparatus, mobile station apparatus, transmission timing control method and radio communication method used in radio communication of an OFDMA (Orthogonal Frequency Division Multiple Access)-TDD (Time Division Duplex) scheme or the like.

BACKGROUND ART

In recent years, in radio communication, in particular, in mobile communication, various information such as images other than speech becomes targets of transmission. In accordance with diversification of transmission targets, it is required to realize a technique of transmitting information at high speed. OFDM (Orthogonal Frequency Division Multiplexing), which is one of the multicarrier transmission schemes, is attracting attention as a transmission scheme capable of responding to the above requirement.

OFDMA (Orthogonal Frequency Division Multiple Access), which is a multiple access scheme of OFDM, is a technique of dividing a frequency band available in a radio communication system into a plurality of bands and assigning each user (such as a mobile station apparatus) to one of the plurality of bands, and thereby achieving frequency multiplexing of a plurality of users.

Radio communication systems that apply OFDMA include an OFDMA-TDD (Orthogonal Frequency Division Multiple Access-Time Division Duplex) system. In bidirectional radio communication of a TDD scheme, the same frequency band is used for uplink and downlink, and therefore frequency use efficiency is high. Further, asymmetrical times are assigned to uplink and downlink to change the transmission rate, and therefore it is possible to flexibly respond to traffic changes.

In general, distances between a base station apparatus in a given cell and mobile station apparatuses that exists in the cell are different, and therefore the propagation delay times between the base station apparatus and the mobile station apparatuses are also different. Hereinafter, this difference of propagation delay times will be referred to as "propagation delay difference." Normally, with a TDD scheme, mobile station apparatuses start transmission of uplink signals after downlink signals are received and a guard period (also referred to as "guard time") has elapsed. At this time, due to a propagation delay difference, shift sometimes occurs in timings at which transmission signals of mobile station apparatuses arrive at a base station apparatus. As a result, intersymbol interference wherein the transmission signals of a plurality of mobile station apparatuses interfere with one another (hereafter "interference between users") occurs.

As a method of preventing occurrence of intersymbol interference in radio communication of an OFDMA-TDD scheme, a method of controlling transmission timings of uplink signals is proposed (see, for example, Patent Document 1). In this transmission timing control method, uplink transmission timings are individually set per mobile station apparatus so that timings at which transmission signals of mobile station apparatuses arrive at a base station apparatus falls within a predetermined range. The set transmission timings are reported to mobile station apparatuses from a base station apparatus. Mobile station apparatuses transmit signals according to the reported timings.

Patent Document 1: Japanese Patent Application Laid-Open No. HEI 11-113049

DISCLOSURE OF INVENTION

Problems to be Solved by the Invention

However, the above-described conventional transmission timing control method has a problem that transmission efficiency may decrease.

In order to specifically explain this problem, a typical example of a radio communication is assumed.

In this example, three frequency multiplexed mobile station apparatuses MS #1, MS #2 and MS #3, and base station apparatus BS #1 perform radio communication. Further, out of mobile station apparatuses MS #1, MS #2 and MS #3, mobile station apparatus MS #1 is located closest to base station apparatus BS #1, and mobile station apparatus MS #3 is located farthest from base station apparatus BS #1. That is, a propagation delay time of mobile station apparatus #3 is longest, and a propagation delay time of mobile station apparatus #1 is shortest.

In this radio communication system, for example, in order to synchronize in slot units or frame units arrival times of transmission signals of mobile station apparatus #1 and mobile station apparatus #2 having shorter propagation delay times than mobile station apparatus #3 with an arrival time of a transmission signal of mobile station apparatus #3, processing of delaying transmission timings of the transmission signals of mobile station apparatus #1 and mobile station apparatus #2 is performed. When such processing is performed, due to one mobile station apparatus #3 having the longest propagation delay time, a period occurs wherein all other mobile station apparatuses #1 and #2 cannot transmit anything. As a result, transmission efficiency of the overall system decreases. This phenomenon of a decrease in transmission efficiency becomes significant in accordance with an increase in the maximum propagation delay time.

It is therefore an object of the present invention to provide a radio communication method, base station apparatus, mobile station apparatus, and the like, capable of improving transmission efficiency in uplink communication of an OFDMA-TDD system, or the like.

Means for Solving the Problem

The radio communication method of the present invention has: a setting step of setting a signal length and a transmission timing of a transmission signal according to a propagation delay time; and a transmitting step of transmitting the transmission signal having the signal length at the transmission timing. Further, in the setting step, the signal length is set longer for the shorter propagation delay time, and the transmission timing is set earlier for a transmission signal having the longer signal length.

For example, a mobile station apparatus of the present invention that employs the above-described radio communication method employs a configuration having: an acquiring section that acquires a signal length and a transmission timing of a transmission signal that are set according to a propagation delay time between the mobile station apparatus and a base station; and a transmitting section that transmits the transmission signal having the signal length to the base station at the transmission timing.

Advantageous Effect Of The Invention

According to the present invention, it is possible to improve transmission efficiency in uplink communication of an OFDMA-TDD system, or the like.

BEST MODE FOR CARRYING OUT THE INVENTION

Embodiments of the present invention will now be described in detail with reference to the accompanying drawings.

(Embodiment 1)

Figure 1:
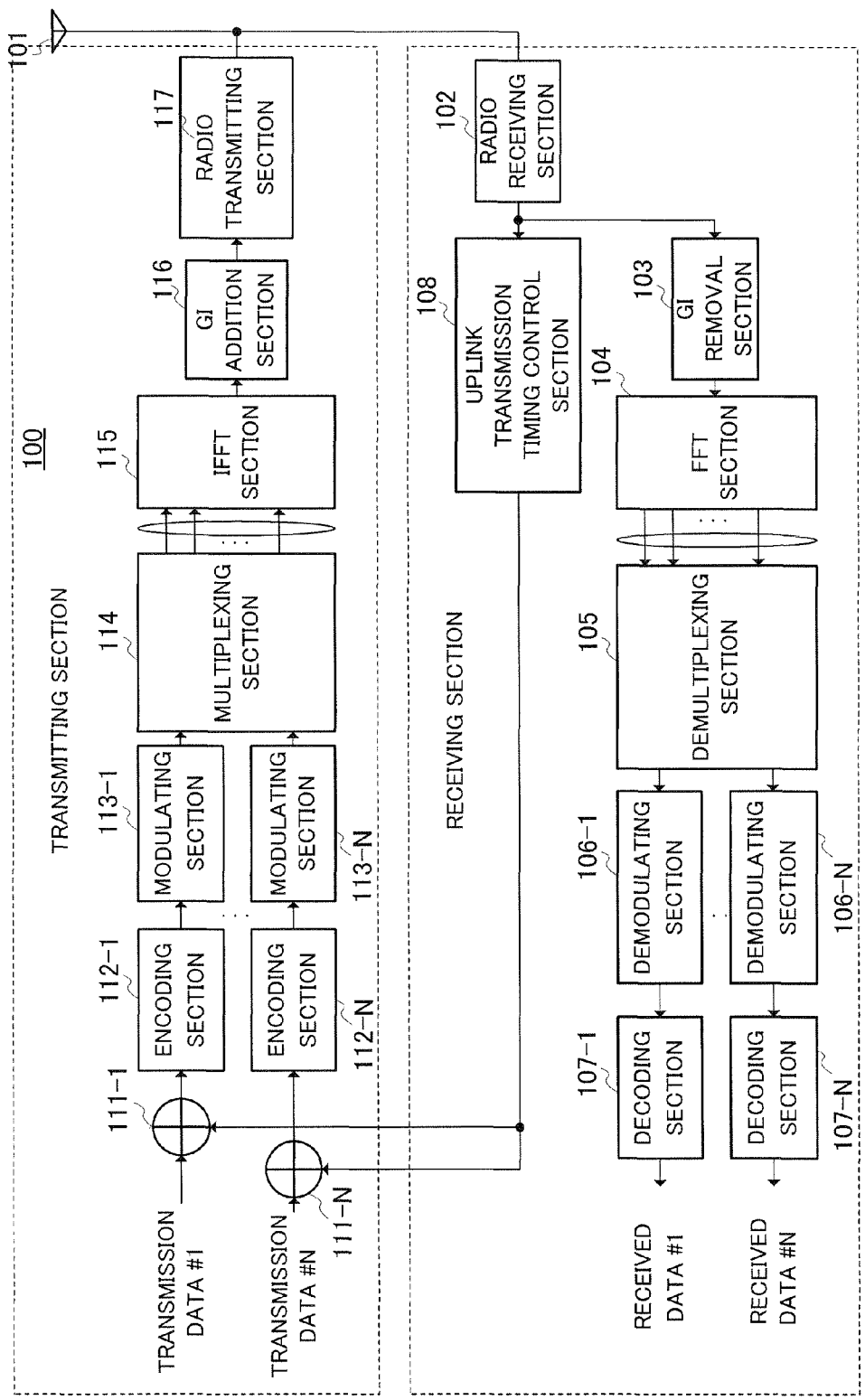
FIG. 1 is a block diagram showing a configuration of a base station apparatus according to Embodiment 1 of the present invention.

FIG. 1 is a block diagram showing a configuration of a base station apparatus (hereinafter, "base station") which is provided with a transmission timing control apparatus according to Embodiment 1 of the present invention.

Base station 100 of FIG. 1 has antenna 101, radio receiving section 102, GI (Guard Interval) removal section 103, FFT (Fast Fourier Transform) section 104, demultiplexing section 105, N (where N is an integer of 2 or higher) demodulating sections 106-1 to 106-N, N decoding sections 107-1 to 107-N, uplink transmission timing control section 108, N multiplexing sections 111-1 to 111-N, N encoding sections 112-1 to 112-N, N modulating sections 113-1 to 113-N, multiplexing section 114, IFFT (Inverse Fast Fourier Transform) section 115, GI addition section 116 and radio transmitting section 117. The combination of radio receiving section 102, GI removal section 103, FFT section 104, demultiplexing section 105, demodulating sections 106-1 to 106-N, decoding sections 107-1 to 107-N and uplink transmission timing control section 108 configures a receiving section. Further, the combination of multiplexing sections 111-1 to 111-N, encoding sections 112-1 to 112-N, modulating sections 113-1 to 113-N, multiplexing section 114, IFFT section 115, GI addition section 116, and radio transmitting section 117 configures a transmitting section.

Furthermore, N demodulating sections 106-1 to 106-N have the same configuration and will be referred to as "demodulating section 106" when arbitrary one of N demodulating sections 106-1 to 106-N is described in the following description. Similarly, N decoding sections 107-1 to 107-N, N multiplexing sections 111-1 to 111-N, N encoding sections 112-1 to 112-N and modulating sections 113-1 to 113-N are referred to as "decoding section 107," "multiplexing section 111," "encoding section 112," and "demodulating section 113," respectively.

Base station 100 is used in an OFDMA-TDD system and performs radio communication with N mobile station apparatuses (hereinafter "mobile stations") #1 to #N.

In base station 100, radio receiving section 102 receives a multiplexed signal wherein the signals transmitted from mobile stations #1 to #N are multiplexed, and performs predetermined radio reception processing (such as down-conversion and A/D conversion) on the received multiplexed signal. The multiplexed signal subjected to radio reception processing is outputted to GI removal section 103 and uplink transmission timing control section 108.

GI removal section 103 removes the GI added in a predetermined position of the multiplexed signal inputted from radio receiving section 102. The GI removed multiplexed signal is outputted to FFT section 104.

FFT section 104 implements FFT processing on the multiplexed signal inputted from GI removal section 103. The multiplexed signal subjected to FFT processing is outputted to demultiplexing section 105.

Demultiplexing section 105 demultiplexes the multiplexed signal inputted from FFT section 104 and obtains data #1 to #N transmitted from mobile stations #1 to #N, respectively. Data #n from mobile station #n (where n is an arbitrary integer within the range of 1 to N) is inputted to demodulating section 106.

Demodulating section 106 demodulates data #n inputted from demultiplexing section 105, and then decoding section 107 decodes demodulated data #n. Decoded data #n is outputted as received data #n.

Uplink transmission timing control section 108, as a transmission timing control apparatus, controls transmission timings of mobile stations #1 to #N using the multiplexed signal inputted from radio receiving section 102. As a result of this transmission timing control, signal lengths of transmission signals of mobile stations #1 to #N become different. N transmission timing report signals #1 to #N are generated as a result of transmission timing control. Transmission timing report signal #n generated for mobile station #n is outputted to multiplexing section 111. Specific operation of transmission timing control will be described later.

Multiplexing section 111 multiplexes transmission timing report signal #n addressed to mobile station #n with transmission data #n addressed to mobile station #n and obtains multiplexed signal #n. Multiplexed signal #n is outputted to encoding section 112.

Encoding section 112 encodes multiplexed signal #n inputted from multiplexing section 111. Modulating section 113 modulates multiplexed signal #n encoded by encoding section 112 and obtains modulated signal #n. Modulated signal #n is comprised of a sequence of modulated symbols. Modulated signal #n is outputted to multiplexing section 114.

Multiplexing section 114 multiplexes modulated signal #n inputted from modulating section 113 and obtains a frequency multiplexed signal. This frequency multiplexed signal is outputted to IFFT section 115. IFFT section 115 performs IFFT processing on the frequency multiplexed signal inputted from multiplexing section 114. In this embodiment, modulated signal #n is a signal assigned to nth subcarrier fn through this IFFT processing.

GI addition section 116 adds a GI in a predetermined position of the frequency multiplexed signal subjected to IFFT processing by IFFT section 115. Radio transmitting section 117 performs predetermined radio transmission processing (such as D/A conversion, and up-conversion) on the frequency multiplexed signal to which the GI is added by GI addition section 116, and transmits the frequency multiplexed signal subjected to radio transmission processing to mobile station apparatuses #1 to #N from antenna 101.

Figure 2:
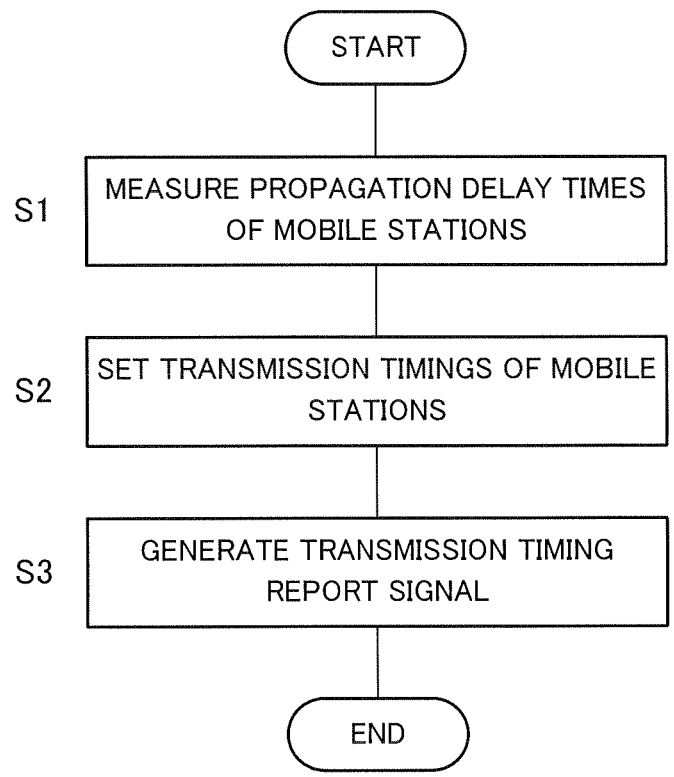
FIG. 2 is a flowchart for explaining an operation example of an uplink transmission timing control section according to Embodiment 1.

Here, the specific operation of transmission timing control of uplink transmission timing control section 108 will now be described. FIG. 2 is a flowchart for explaining an operation example of transmission timing control of uplink transmission timing control section 108.

First, in step S1, uplink transmission timing control section 108, as an acquisition means, measures propagation delay times $\tau 1$ to $\tau N$ of mobile stations #1 to #N. As a measurement method, methods such as a method of utilizing a pilot signal inserted at a determined position in a frame and a method of detecting a relative propagation delay difference between mobile stations due to GI correlation can be considered.

Then, in step S2, uplink transmission timing control section 108, as a determination means, sets transmission timings of mobile stations #1 to #N using measured propagation delay times $\tau 1$ to $\tau N$.

The processing of step S2 will now be described in more detail. In this embodiment, timing control values #1 to #N for controlling transmission timings of mobile stations #1 to #N are calculated. Timing control value #n indicates a time interval from the timing at which mobile station #n completes reception of OFDM symbols in downlink (hereinafter "downlink symbols") to the timing at which mobile station #n starts transmission of OFDM symbols in uplink (hereinafter "uplink symbols"). The first process step performed in a calculation process of timing control value #n is cross-comparison of measured propagation delay times $\tau 1$ to $\tau N$. As a result of this comparison, mobile station #M (where M is an any integer within the range of 1 to N) having the largest propagation delay time, that is, the farthest distance to base station 100 among mobile stations #1 to #N, is specified. To improve transmission efficiency, it is preferable that timing control value TM of mobile station #M is made as small as possible. Thus, in this embodiment, timing control value TM is determined by shortest control time T (system design value) required by mobile stations #1 to #N from downlink symbol reception completion to uplink symbol transmission start.

After timing control value TM of mobile station #M is determined, the number of additional OFDM symbols αp (where αp is a natural number) of mobile stations #n other than mobile station #M (hereinafter "mobile station #p") is calculated. Furthermore, the number of additional OFDM symbols αp indicates the number of uplink symbols of mobile station #p that can be received up to the timing at which base station 100 starts receiving uplink symbols of mobile station #M in an uplink slot. In mobile station #p, uplink symbols to be transmitted are added according to the number of additional OFDM symbols αp.

In the calculation processing of the number of additional OFDM symbols αp, propagation delay time τp of mobile station #p, propagation delay time τM of mobile station #M, and OFDM symbol length (that is, OFDM symbol time length) L are used. Specifically, the number of additional OFDM symbols αp is calculated by obtaining the maximum natural number less than or equal to a value obtained by dividing twice the difference between propagation delay time τp and propagation delay time τM by OFDM symbol length L. Furthermore, the difference between propagation delay time τp and propagation delay time τM is a propagation delay difference between mobile station #p and mobile station #M.

After the number of additional OFDM symbols αp is calculated, timing control value Tp of mobile station #p is cal-culated. Specifically, timing control value Tp is calculated by the following equation 1 using propagation delay time τp of mobile station #p, propagation delay time τM of mobile station #M, OFDM symbol length L, shortest control time T and the number of additional OFDM symbols αp.

$$Tp = 2(\tau p - \tau M) + T - \alpha p \times L \quad \text{(Equation 1)}$$

For example, it is assumed that three mobiles stations #1, #2 and #3 that perform radio communication with base station 100 are located at 1 km, 5 km and 10 km away from base station 100, respectively, and have propagation delay times $\tau 1, \tau 2,$ and $\tau 3$ of 3.3 [μs], 16.7 [μs], and 33.3 [μs], respectively. Further, it is assumed that OFDM symbol length L is 8 [μs] and T=10 [μs].

In this case, timing control value T3 of mobile station #3 is determined to be 10 [μs]. The number of additional OFDM symbols α1 of mobile station #1 is determined to be the largest natural number that does not exceed the value obtained as a result of calculation 2(33.3−3.3)/8, that is, 7. The number of additional OFDM symbols α2 of mobile station #2 is determined to be the largest natural number that does not exceed the value obtained as a result of calculation 2 (33.3−16.7)/8, that is, 4. Thus, timing control value T1 of mobile station #1 and timing control value T2 of mobile station #2 are calculated by the following equations 2 and 3, respectively:

$$T1 = 1(33.3 - 3.3) + 10 - 7 \times 8 = 14 \ [\mu s] \quad \text{(Equation 2)}$$

$$T2 = 1(33.3 - 16.7) + 10 - 4 \times 8 = 11.2 \ [\mu s] \quad \text{(Equation 3)}$$

That is, in step S2, a transmission timing of mobile station #p and a transmission timing of mobile station #M are determined so that a reception timing at which base station 100 starts receiving symbols from mobile station #p in a given uplink slot is earlier by αp times of OFDM symbol length L than a reception timing at which base station 100 starts receiving symbols from mobile station #M in the uplink slot. Furthermore, "α p" may simply be expressed as "α" (that is, αp=α).

Then, in step S3, transmission timing report signal #n indicating a determined or calculated timing control value Tn is generated. More preferably, transmission timing report signal #p indicates timing control value Tp as well as timing control value TM or the number of additional OFDM symbols αp. Transmission timing report signal #n is multiplexed with transmission data #n in multiplexing section 111.

Figure 3:
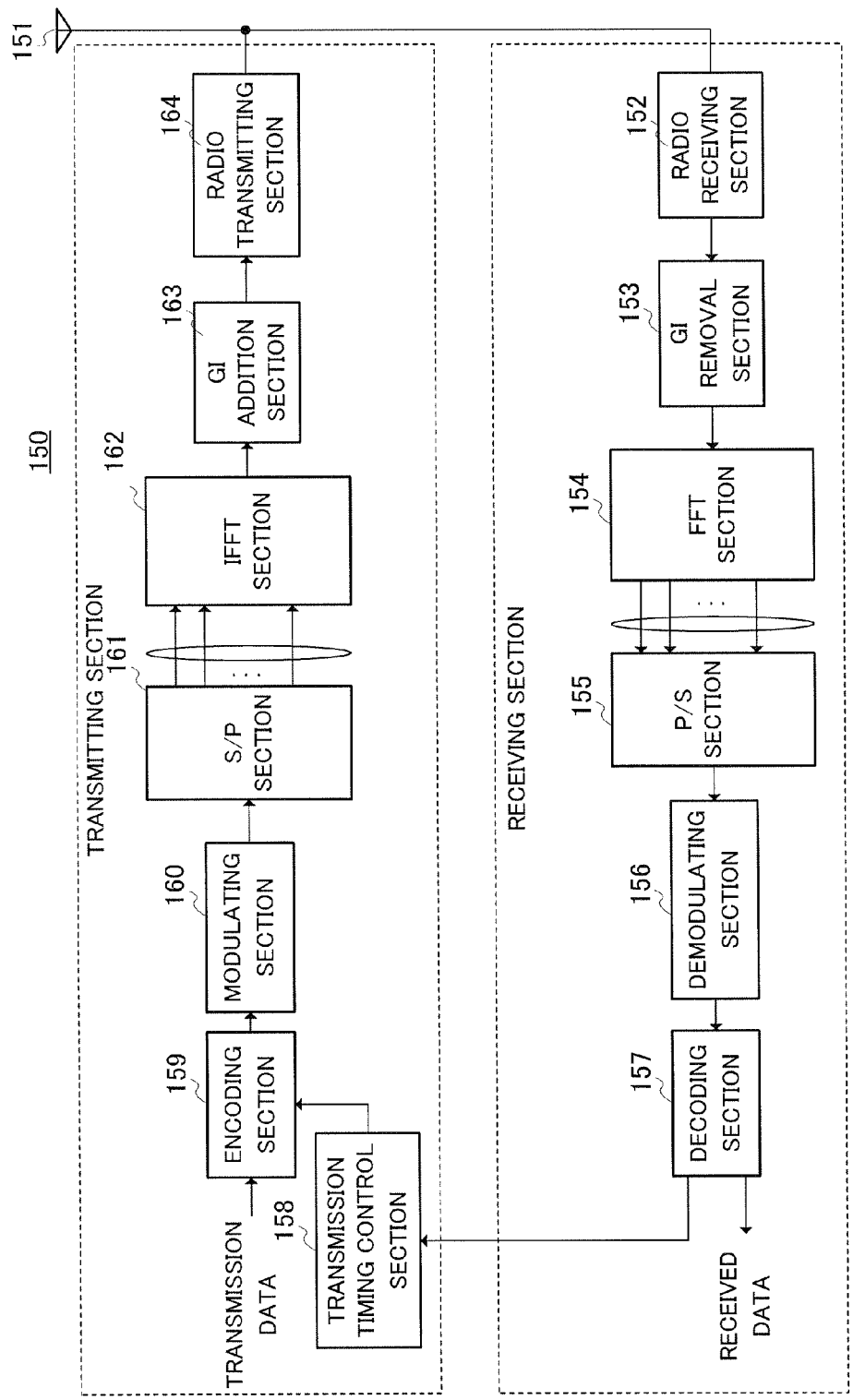
FIG. 3 is a block diagram showing a configuration of a mobile station apparatus according to Embodiment 1.

Next, the configuration of mobile station #n that performs radio communication with base station 100 will be described. The configuration of mobile station #n is shown in FIG. 3. Mobile station 150 of FIG. 3 has antenna 151, radio receiving section 152, GI removal section 153, FFT section 154, parallel/serial conversion (P/S) section 155, demodulating section 156, decoding section 157, transmission timing control section 158, encoding section 159, modulating section 160, serial/parallel conversion (S/P) section 161, IFFT section 162, GI addition section 163 and radio transmitting section 164. Furthermore, the combination of radio receiving section 152, GI removal section 153, FFT section 154, parallel/serial conversion (P/S) section 155, demodulating section 156 and decoding section 157 configures a receiving section. Further, the combination of transmission timing control section 158, encoding section 159, modulating section 160, serial/parallel conversion (S/P) section 161, IFFT section 162, GI addition section 163 and radio transmitting section 164 configures a transmitting section.

Radio receiving section 152 receives the frequency multiplexed signal transmitted from base station 100 by antenna 151 and performs predetermined radio reception processing on the received frequency multiplexed signal. The frequency multiplexed signal subjected to radio reception processing is outputted to GI removal section 153.

GI removal section 153 removes the GI added in a predetermined position of the frequency multiplexed signal inputted from radio receiving section 152. The GI removed frequency multiplexed signal is outputted to FFT section 154.

FFT section 154 performs FFT processing on the frequency multiplexed signal inputted from GI removal section 153. Modulated signal #n assigned to subcarrier fn is acquired from the frequency multiplexed signal through FFT processing of FFT section 154. Acquired modulated signal #n is outputted to P/S section 155.

P/S section 155 performs parallel/serial conversion processing on modulated signal #n inputted from FFT section 154. Modulated signal #n subjected to parallel/serial conversion is outputted to demodulating section 156.

Demodulating section 156 demodulates symbols of modulated signal #n inputted from P/S section 155 and obtains data #n. Decoding section 157 decodes data #n obtained by demodulating section 156, and outputs decoded data #n as received data #n. Transmission timing control signal #n included in received data #n is outputted to transmission timing control section 158.

Transmission timing control section 158 operates according to timing control value Tn indicated in transmission timing control signal #n. Specifically, transmission timing control section 158 adjusts an operation timing of encoding section 159 so that uplink symbol transmission starts after downlink symbol reception is completed and the time indicated as timing control value Tn has elapsed, and indicates an operation timing to encoding section 159.

Encoding section 159 encodes transmission data #n according to the indication from transmission timing control section 158. Modulating section 160 modulates transmission data #n encoded by encoding section 159. Modulated signal #n obtained by this modulation processing is outputted to S/P section 161.

S/P section 161 performs serial/parallel conversion processing on modulated signal #n inputted from modulating section 160. Modulated signal #n subjected to serial/parallel conversion is outputted to IFFT section 162.

IFFT section 162 performs IFFT processing on modulated signal #n inputted from S/P section 161. Modulated signal #n subjected to IFFT processing is outputted to GI addition section 163.

GI addition section 163 adds GI in a predetermined position of modulated signal #n inputted from IFFT section 162. Modulated signal #n subjected to GI addition is outputted to radio transmitting section 164.

Radio transmitting section 164 performs predetermined radio transmission processing on modulated signal #n outputted from GI addition section 163. Then, modulated signal #n subjected to radio transmission processing is transmitted from antenna 151 to base station 100.

Figure 4:
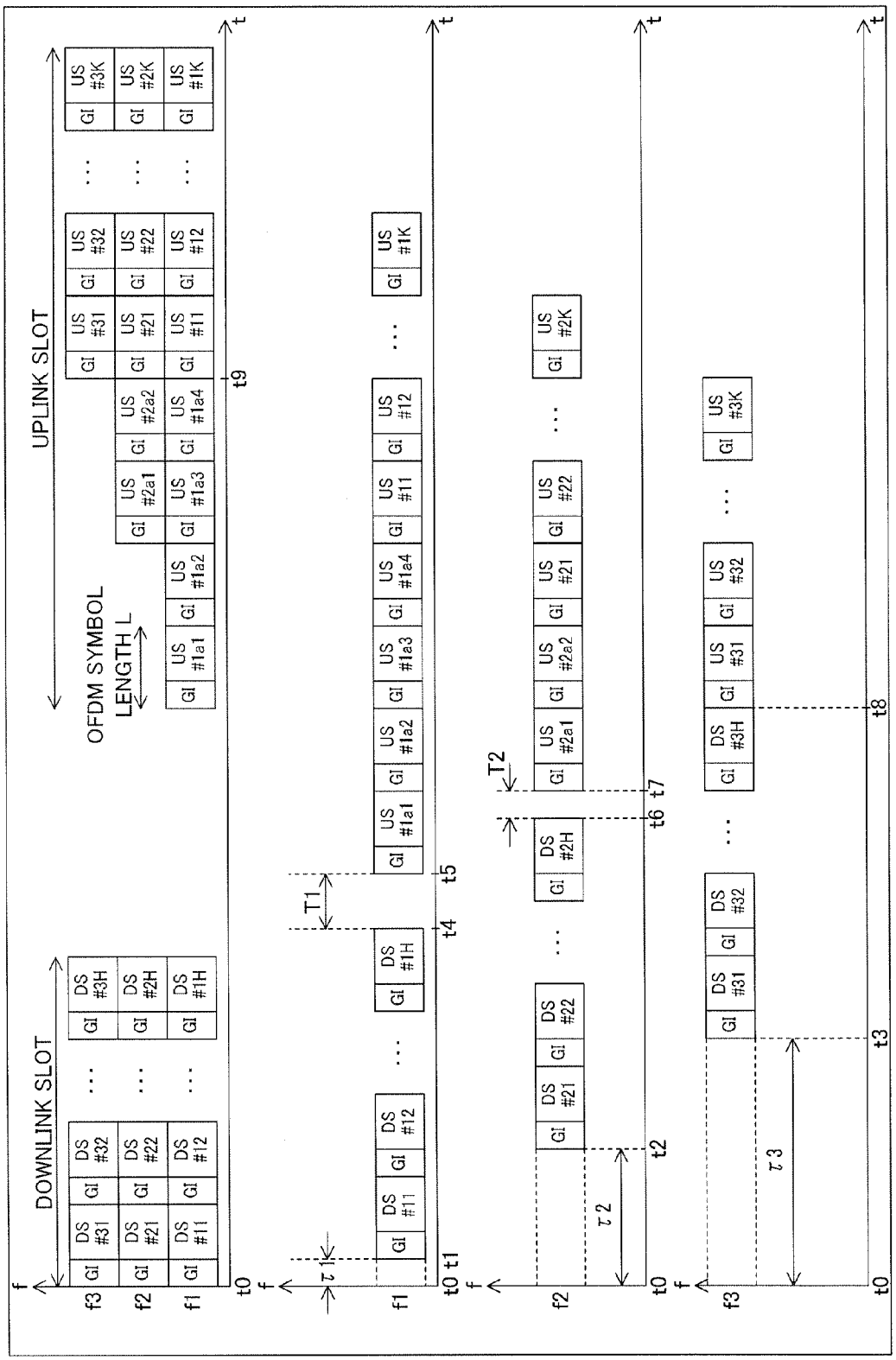
FIG. 4 explains an operation example of radio communication between the base station apparatus and the mobile station apparatuses according to Embodiment 1.

Now, the radio communication operation performed between base station 100 and a plurality of mobile stations 150 will be described. Here, a case will be described as an example where the number of mobile stations 150 that communicate with base station 100 is three. FIG. 4 explains an operation example of radio communication between base station 100 and three mobile stations #1 to #3. The first, second, third, and fourth levels of FIG. 4 show transmission/reception operation of base station 100, transmission/reception operation of mobile station #1, transmission/reception operation of mobile station #2, and transmission/reception operation of mobile station #3, respectively.

At time t0, base station 100 transmits a multiplexed signal to mobile stations #1 to #3. The multiplexed signal includes H downlink symbols DS #11 to #1H (where H is a natural number) addressed to mobile station #1, H downlink symbols DS #21 to #2H addressed to mobile station #2, and H downlink symbols DS #31 to #3H addressed to mobile station #3. Thus, head symbols of a downlink slot are downlink symbols DS #11, #21 and #31, and end symbols of a downlink slot are downlink symbols DS #1H, #2H and #3H.

At time t1 after propagation delay time $\tau 1$ has elapsed from time t0, mobile station #1 starts receiving downlink symbols DS #11 to #1H. At time t2 after propagation delay time $\tau 2$ has elapsed from time t0, mobile station #2 starts receiving downlink symbols DS #21 to #2H. At time t3 after propagation delay time $\tau 3$ has elapsed from time t0, mobile station #3 starts receiving downlink symbols DS #31 to #3H. That is, in this example, the mobile station located farthest from base station 100 is mobile station #3.

Reception of downlink symbols DS #11 to #1H of mobile station #1 ends at time t4. Reception of downlink symbols DS #21 to #2H of mobile station #2 ends at time t6. And, reception of downlink symbols DS #31 to #3H of mobile station #3 ends at time t8.

Mobile station #3 starts transmitting K (where K is a natural number) uplink symbols US #31 to #3K at time t8. In this example, shortest control time T is set to zero.

Further, mobile station #2 operates according to timing control value T2 reported from base station 100. Specifically, mobile station #2 starts transmitting uplink symbols after the time interval indicated as timing control value T2 has elapsed from time t6, that is, at time t7. The uplink symbols transmitted from mobile station #2 include K uplink symbols US #21 to #2K and one or more additional symbols. At time t7, transmission of additional symbols starts and, after transmission of the additional symbols is completed, transmission of K uplink symbols US #21 to #2K starts. The number of additional symbols is equal to the number of additional OFDM symbols $\alpha 2$ calculated by base station 100. FIG. 4 shows an example of two additional symbols US #2a1 and #2a2.

Mobile station #1 operates according to timing control value T1 reported from base station 100. Specifically, mobile station #1 starts transmitting uplink symbols after the time interval indicated as timing control value T1 has elapsed from time t4, that is, at time t5. The uplink symbols transmitted from mobile station #1 include K uplink symbols US #11 to #1K and one or more additional symbols. At time t5, transmission of additional symbols starts and, after transmission of the additional symbols is completed, transmission of K uplink symbols US #11 to #1K starts. The number of additional symbols is equal to the number of additional OFDM symbols $\alpha 1$ calculated by base station 100. FIG. 4 shows an example of four additional symbols US #1a1 to #1a4.

Base station 100 starts receiving multiplexed signals that include uplink symbols US #11 to #1K, #21 to #2K, and #31 to #3K at time t9. The $\alpha 2$ additional symbols transmitted from mobile station #2 and the $\alpha 1$ additional symbols transmitted from mobile station #1 are received before time t9. Thus, a head symbol of a uplink slot is additional symbol US #1a1, and end symbols of a uplink slot are uplink symbols US #1K, #2K and #3K.

As shown in this figure, reception timings of uplink symbols US #1a1, #2a1 and #31 first received from mobile stations #1 to #3 in an uplink slot are different, but controlled so that reception timings of a plurality of symbols received in parallel (uplink symbols US #11, #21 and #31, for example) are uniform. In other words, uplink transmission timings are controlled so that reception timings of an uplink slot are uniform in symbol units. This prevents occurrence of interference between users.

In this way, according to the present invention, when propagation delay time $\tau p$ of mobile station #p is less than propagation delay time $\tau M$ of mobile station #M in an OFDMA-TDD system, transmission timings of mobile station #p and mobile station #M are determined so that a timing at which base station 100 starts receiving symbols from mobile station #p in an uplink slot is earlier by up times of OFDM symbol length L than a timing at which base station 100 starts receiving symbols from mobile station #M in the same slot, so that, in the uplink slot, mobile station #p can transmit more symbols by $\alpha p$ symbols than mobile station #M to base station 100, and it is possible to prevent interference between the symbols transmitted from mobile station #p and the symbols transmitted from mobile station #M and, as a result, improve the transmission efficiency of uplink communication in the OFDMA-TDD system.

Furthermore, in this embodiment, base station 100 measures propagation delay time $\tau n$, but mobile station #n may measure propagation delay time $\tau n$ and report propagation delay time $\tau n$ to base station 100.

Also, in this embodiment, IFFT section 115 assigns modulated signal #n to nth subcarrier fn, but modulated signal #n may be assigned to a plurality of subcarriers. In this case, FFT section 104 acquires modulated signal #n assigned to a plurality of subcarriers.

Further, in this embodiment, the configuration is adopted where a transmitting section of mobile station 150 outputs a control signal of transmission timing control section 158 only to encoding section 159, but the control signal may be outputted to encoding section 159, modulating section 160, serial/parallel conversion (S/P) section 161, and the like, to report the respective processing start timings.

(Embodiment 2)

Figure 5:
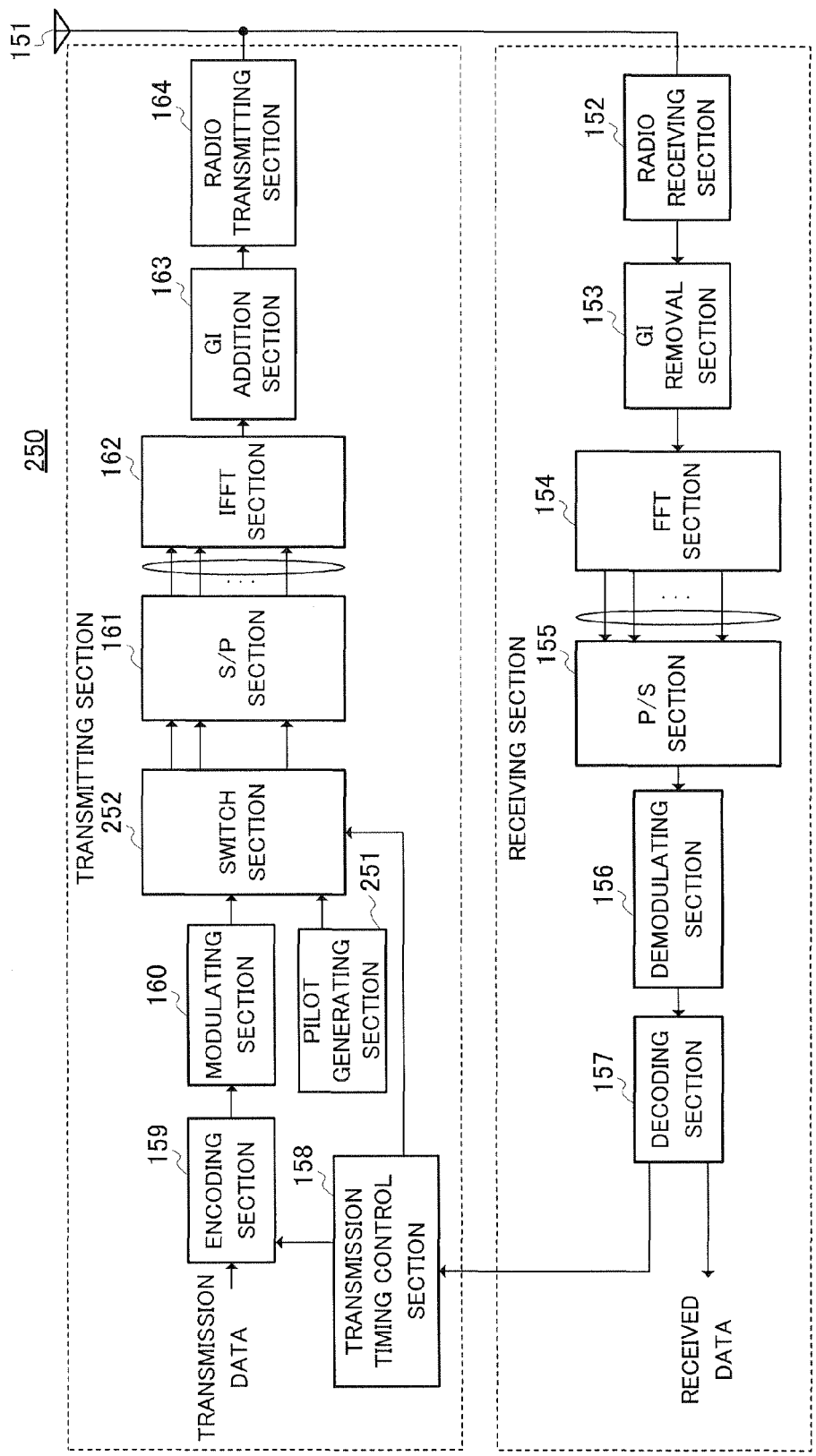
FIG. 5 is a block diagram showing a configuration of a mobile station apparatus according to Embodiment 2 of the present invention.

FIG. 5 is a block diagram showing a configuration of a mobile station according to Embodiment 2 of the present invention. The mobile station described in this embodiment has a basic configuration similar to mobile station 150 described in Embodiment 1. Therefore, components that are the same as those described in Embodiment 1 will be assigned the same reference numerals without further explanation.

Mobile station 250 of FIG. 5 has pilot generating section 251 and switch section 252 in addition to components of mobile station 150. Mobile station 250 performs radio communication with base station 100 described in Embodiment 1.

Pilot generating section 251 generates a pilot symbol, which is a known signal, and outputs the generated pilot symbol to switch section 252. Switch section 252 switches output to S/P section 161 according to the switching instruction from transmission timing control section 158. For example, switch section 252 outputs the pilot symbol inputted from pilot generating section 251 to S/P section 151 during the period a switching instruction is received, and outputs modulated signal #n inputted from modulating section 160 to S/P section 161 during the period a switching instruction is not received.

In this embodiment, transmission timing control section 158 outputs a switching instruction to switch section 252 according to transmission timing control signal #p inputted from decoding section 157. Transmission timing control section 158, for example, outputs a switching instruction according to the transmission timing specified by timing control value Tp and the timing of downlink symbol reception completion. Then, when a period having a time length of $L \times \alpha p$ from that transmission timing has elapsed, output of the switching instruction is stopped.

Figure 6:
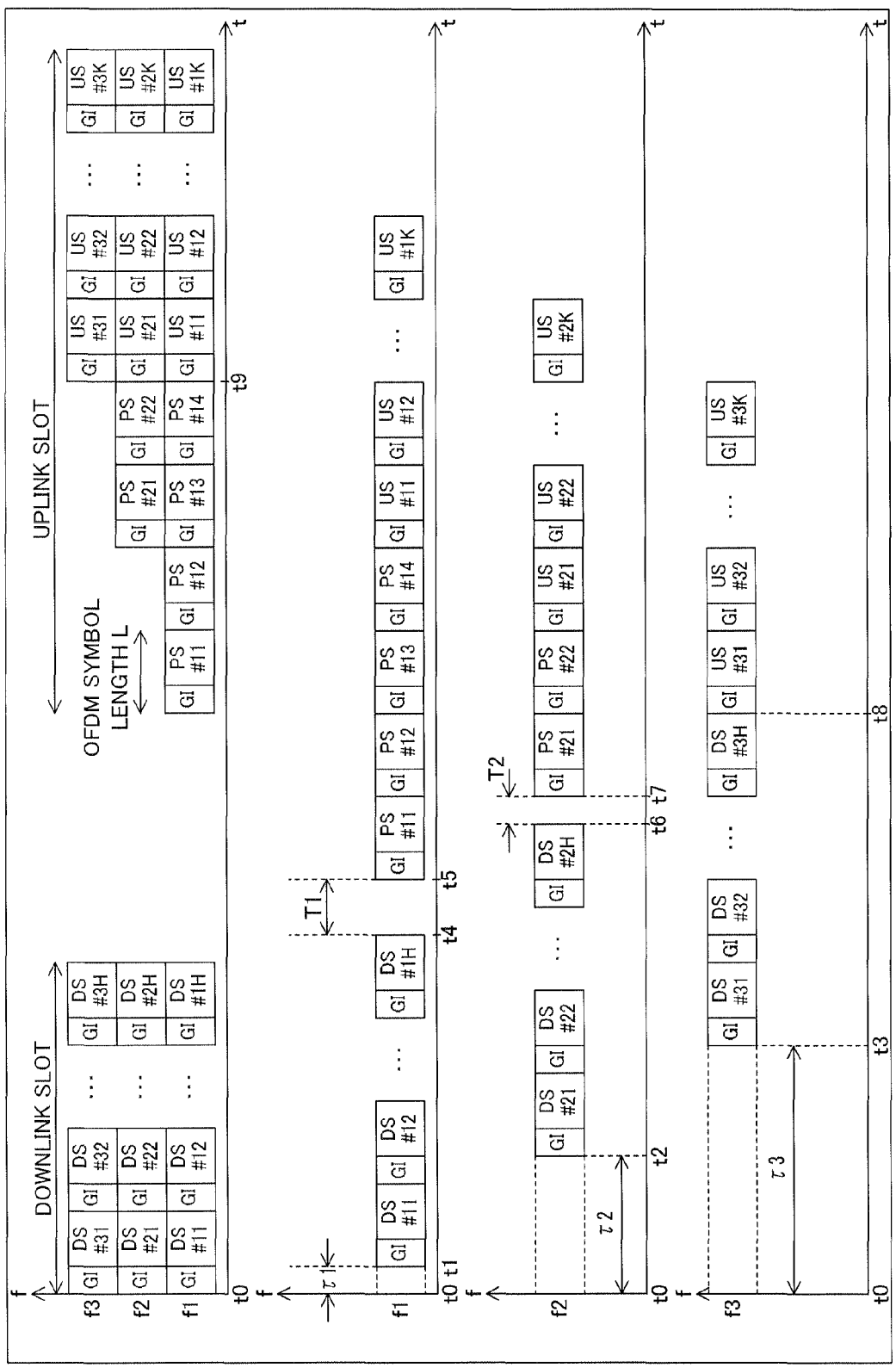
FIG. 6 explains an operation example of radio communication between the base station apparatus and the mobile station apparatuses according to Embodiment 2 of the present invention.

Next, the radio communication operation performed between base station 100 and a plurality of mobile stations 250 will be described. Here, a case will be described as an example where the number of mobile stations 250 that communicate with base station 100 is three. FIG. 6 explains an operation example of radio communication between base station 100 and three mobile stations #1 to #3. The first, second, third, and fourth levels of FIG. 6 show transmission/reception operation of base station 100, transmission/reception operation of mobile station #1, transmission/reception operation of mobile station #2, and transmission/reception operation of mobile station #3, respectively. To simplify the explanation, the details of the operation at propagation delay times $\tau 1$ to $\tau 3$ of mobile stations #1 to #3, timing control values T1 to T3 and times t0 to t9 will be omitted.

As shown in the figure, pilot symbols are transmitted as additional symbols from mobile stations #1 and #2. Specifically, mobile station #1 transmits $\alpha 1$ pilot symbols as additional symbols. FIG. 6 shows an example of four pilot symbols PS #11 to #14. Mobile station #2 transmits $\alpha 2$ pilot symbols as additional symbols. FIG. 6 shows an example of two pilot symbols PS #21 to #22.

In this way, according to this embodiment, mobile station #p transmits a pilot symbol as at least one symbol of $\alpha p$ symbols transmitted in series from the transmission timing. Mobile station #p having a relatively short propagation delay time has a relatively high uplink reception quality, and therefore modulation schemes having a high M-ary number such as 16QAM (Quadrature Amplitude Modulation) and 64QAM may be applied. Modulation schemes having a high M-ary number substantially affect channel estimation accuracy and demodulation performance compared to modulation schemes having a low M-ary number such as BPSK (Binary Phase Shift Keying) and QPSK (Quadrature Phase Shift Keying). Therefore, as in this embodiment, when mobile station #p having a relatively short propagation delay time transmits a large number of pilot symbols, it is possible to improve channel estimation accuracy and the transmission efficiency of the overall system.

Furthermore, in this embodiment, the configuration has been adopted where the additional symbols of mobile station #n are transmitted by subcarrier fn assigned to mobile station #n, but the configuration may be also adopted where the additional symbols are transmitted also using a subcarrier assigned to a mobile station having a longer propagation delay time than mobile station #n. According to this configuration, a mobile station having a short propagation delay time can transmit an even larger number of symbols, thereby improving transmission efficiency. At this time, a plurality of subcarriers may be assigned to one mobile station.

The embodiments of the present invention have been described.

The radio communication method, base station apparatus, mobile station apparatus and on the like according to the present invention are not limited to the above embodiments and can be implemented by making various modification.

For example, here, the case has been described as an example where transmission timings of transmission signals from mobile stations are controlled according to lengths of the propagation delay times between the base station and mobile stations, but in place of the propagation delay times, it is possible to use communication distances between the base station and mobile stations, downlink received power of the mobile stations, and the like.

Further, the case has been described as an example where an OFDMA-TDD scheme is adopted as a communication scheme, but the present invention is not limited to this, and it is possible to adopt other communication schemes if the communication scheme is one wherein transmission signals from a plurality of radio transmission apparatuses are multiplexed in the same time period (time slot, for example). For example, the present invention may be applied to a communication system of an FDMA-TDD scheme.

Moreover, here, a case has been described as an example where the present invention is configured with hardware, however, the present invention can be implemented with software. For example, by describing the radio communication method algorithm according to the present invention in a programming language, storing this program in a memory and making an information processing section execute this program, it is possible to implement the same function as the mobile station apparatus and base station apparatus of the present invention.

Further, a base station in the above-described embodiments may be expressed as Node B, a mobile station as UE, and a subcarrier as Tone.

The function blocks used in the descriptions of the above embodiments are typically implemented as LSIs, which are integrated circuits. These may be implemented individually as single chips, or a single chip may incorporate some or all of them.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general-purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2005-005287, filed on Jan. 12, 2005, the entire content of which is expressly incorporated by reference herein.

Industrial Applicability

The transmission timing control apparatus, base station apparatus, mobile station apparatus, transmission timing control method and radio communication method of the present invention can be applied to base station apparatuses, mobile station apparatuses, and the like, of an OFDMA-TDD system.

The invention claimed is:

1. A transmission timing control method comprising:
measuring propagation delay times between a base station apparatus and each of a plurality of mobile station apparatuses; and
setting a number of symbols, each of which has a guard interval, according to the respective propagation delay times, and a transmission timing for a transmission signal for each of the plurality of mobile station apparatuses according to the respective propagation delay times and the set number of symbols, wherein:
the number of symbols is set higher when a shorter propagation delay time is measured, and
the transmission timing is represented as a time interval from completing a reception of a signal transmitted from the base station apparatus at each of the mobile station apparatuses to starting a transmission of the transmission signal from each of the mobile station apparatuses.

2. The transmission timing control method according to claim 1, wherein the transmission timing is set earlier when the number of symbols is set higher.

3. The transmission timing control method according to claim 1, wherein a communication distance or a received power is measured to determine the propagation delay times.

4. The transmission timing control method according to claim 1, wherein transmission timings of transmission signals in a first mobile station apparatus and a second mobile station apparatus in the plurality of mobile station apparatuses are set such that, when a propagation delay time of the first mobile station apparatus is shorter than a propagation delay time of the second mobile station apparatus, a first timing at which the base station apparatus starts receiving a transmission signal from the first mobile station apparatus becomes $\alpha$ (where $\alpha$ is a natural number) times a symbol time length earlier than a second timing at which the base station apparatus starts receiving a transmission signal from the second mobile station apparatus.

5. The transmission timing control method according to claim 1, wherein the number of symbols and the transmission timing are set such that reception timings of respective transmission signals from the plurality of mobile station apparatuses are synchronized in symbol units at the base station apparatus.

6. The transmission timing control method according to claim 1, wherein at least one symbol in the set number of symbols is transmitted as a pilot symbol.

7. A mobile station apparatus comprising:
an acquiring section that acquires a number of symbols, each of which has a guard interval, and a transmission timing for a transmission signal, wherein the number of symbols is set according to a propagation delay time between the mobile station apparatus and a base station apparatus and the transmission timing is set according to the propagation delay time and the set number of symbols; and
a transmitting section that transmits the transmission signal including the set number of symbols, to the base station apparatus, wherein:
the number of symbols is set higher when a shorter propagation delay time is measured, and the transmission timing is represented as a time interval from completing a reception of a signal transmitted from the base station apparatus at the mobile station apparatus to starting a transmission of the transmission signal from the mobile station apparatus.

8. The mobile station apparatus according to claim 7, wherein the transmission timing is set earlier when the number of symbols is set higher.

9. The mobile station apparatus according to claim 7, wherein the transmission timing is set such that when a propagation delay time of a first mobile station apparatus is shorter than a propagation delay time of a second mobile station apparatus in a plurality of mobile station apparatuses, a first timing at which the base station apparatus starts receiving a transmission signal from the first mobile station apparatus becomes $\alpha$ (where $\alpha$ is a natural number) times a symbol time length earlier than a second timing at which the base station apparatus starts receiving a transmission signal from the second mobile station apparatus.

10. The mobile station apparatus according to claim 7, wherein the number of symbols and the transmission timing are set such that reception timings of respective transmission signals from a plurality of mobile station apparatuses are synchronized in symbol units at the base station apparatus.

11. The mobile station apparatus according to claim 7, wherein the transmitting section transmits at least one symbol in the acquired number of symbols as a pilot symbol.

12. A base station apparatus comprising:
a setting section that sets a number of symbols, each of which has a guard interval, according to respective propagation delay times between the base station apparatus and each of a plurality of mobile station apparatuses, and that sets a transmission timing for a transmission signal for each of the plurality of mobile station apparatuses according to the respective propagation delay times and the set number of symbols; and
a report section that reports the set number of symbols and the set transmission timing to the respective mobile station apparatuses, wherein
the setting section sets the number of symbols higher for a shorter propagation delay time, and the transmission timing is represented as a time interval from completing a reception of a signal transmitted from the base station apparatus at each of the mobile station apparatuses to starting a transmission of the transmission signal from each of the mobile station apparatuses.

13. The base station apparatus according to claim 12, wherein the setting section sets the transmission timing earlier when the number of symbols is set higher.

14. The base station apparatus according to claim 12, wherein the setting section sets transmission timings of transmission signals in a first mobile station apparatus and a second mobile station apparatus in the plurality of mobile station apparatuses such that, when a propagation delay time of the first mobile station apparatus is shorter than a propagation delay time of the second mobile station apparatus, a first timing at which the base station apparatus starts receiving a transmission signal from the first mobile station apparatus becomes $\alpha$ (where $\alpha$ is a natural number) times a symbol time length earlier than a second timing at which the base station apparatus starts receiving a transmission signal from the second mobile station apparatus.

15. The base station apparatus according to claim 12, wherein the setting section sets the number of symbols and the transmission timing such that reception timings of respective transmission signals from the plurality of mobile station apparatuses are synchronized in symbol units at the base station apparatus.

16. The base station apparatus according to claim 12, wherein the transmitting section transmits at least one symbol in the set number of symbols as a pilot symbol.

* * * * *